US012226830B2

(12) United States Patent
Ito et al.

(10) Patent No.: US 12,226,830 B2
(45) Date of Patent: Feb. 18, 2025

(54) COMPOSITE MAGNETIC MATERIAL, ELECTRICAL AND ELECTRONIC DEVICE, AND METHOD OF MANUFACTURING COMPOSITE MAGNETIC MATERIAL

(71) Applicant: TOKIN CORPORATION, Shiroishi (JP)

(72) Inventors: Tetsuo Ito, Sendai (JP); Masakazu Abe, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 625 days.

(21) Appl. No.: 16/888,888

(22) Filed: Jun. 1, 2020

(65) Prior Publication Data

US 2020/0384531 A1 Dec. 10, 2020

(30) Foreign Application Priority Data

Jun. 5, 2019 (JP) ................................ 2019-105184

(51) Int. Cl.

| | |
|---|---|
| ***B22F 1/00*** | (2022.01) |
| ***B22F 1/05*** | (2022.01) |
| ***B22F 1/065*** | (2022.01) |
| ***B22F 1/102*** | (2022.01) |
| ***B22F 5/00*** | (2006.01) |
| ***H01F 1/16*** | (2006.01) |
| ***H01F 41/02*** | (2006.01) |

(52) U.S. Cl.

CPC ................ *B22F 5/006* (2013.01); *B22F 1/05* (2022.01); *B22F 1/065* (2022.01); *B22F 1/102* (2022.01); *H01F 1/16* (2013.01); *H01F 41/0233* (2013.01); *B22F 2304/10* (2013.01)

(58) Field of Classification Search

None

See application file for complete search history.

(56) References Cited

U.S. PATENT DOCUMENTS

2007/0252771 A1* 11/2007 Maezawa ......... G06K 19/07771 361/818
2015/0371743 A1* 12/2015 Hashimoto ............. C22C 38/08 428/354

FOREIGN PATENT DOCUMENTS

| | | | | | |
|---|---|---|---|---|---|
| CN | 104854974 | A | * | 8/2015 | ............... H01F 1/26 |
| JP | 2004288941 | A | | 10/2004 | |
| JP | 2005159337 | A | * | 6/2005 | |
| JP | 2006037078 | A | | 2/2006 | |
| JP | 2007258432 | A | | 10/2007 | |
| JP | 2008085057 | A | | 4/2008 | |

(Continued)

OTHER PUBLICATIONS

Machine translation of JP4849220B2. (Year: 2012).*

(Continued)

*Primary Examiner* — Xiaowei Su
(74) *Attorney, Agent, or Firm* — Holtz, Holtz & Volek PC

(57) ABSTRACT

A composite magnetic material comprises spherical soft magnetic metal powder incorporated in the composite magnetic material in a dispersed manner, a flame retardant incorporated in the composite magnetic material in a dispersed manner; and a binder configured to bind the soft magnetic metal powder and the flame retardant. The composite magnetic material is formed and processed into a sheet shape. The composite magnetic material has a volume occupancy of the soft magnetic metal powder of 45 vol % or more and 68 vol % or less.

15 Claims, 5 Drawing Sheets

(56) References Cited

FOREIGN PATENT DOCUMENTS

| | | | | |
|---|---|---|---|---|
| JP | 2009081234 | A | | 4/2009 |
| JP | 2009088237 | A | * | 4/2009 |
| JP | 2010153462 | A | | 7/2010 |
| JP | 4849220 | B2 | * | 1/2012 |

OTHER PUBLICATIONS

Machine translation of JP2009/088237A. (Year: 2009).*
Machine translation of CN 104854974A. (Year: 2015).*
Machine translation of JP 2005-159337A. (Year: 2005).*
English language translation of a Japanese Office Action dated Feb. 5, 2020 issued in Japanese Application No. 2019-105184.
English language translation of a Japanese Office Action dated Jul. 3, 2019 issued in Japanese Application No. 2019-105184.
Japanese Office Action dated Feb. 5, 2020 issued in Japanese Application No. 2019-105184.
Japanese Office Action dated Jul. 3, 2019 issued in Japanese Application No. 2019-105184.
Chinese Office Action (and an English language translation thereof) dated Nov. 30, 2023, issued in counterpart Chinese Application No. 202010489788.2.

* cited by examiner

COMPOSITE MAGNETIC MATERIAL, ELECTRICAL AND ELECTRONIC DEVICE, AND METHOD OF MANUFACTURING COMPOSITE MAGNETIC MATERIAL

This application is based upon and claims the benefit of priority from Japanese patent application No. 2019-105184, filed on Jun. 5, 2019, the disclosure of which is incorporated herein in its entirety by reference.

BACKGROUND OF THE INVENTION

1. Field of the Invention

This invention relates to a composite magnetic material, an electrical and electronic device, and a method of manufacturing a composite magnetic material.

2. Description of the Related Art

A composite magnetic material is a member for suppressing electromagnetic noise, and includes a soft magnetic material. The composite magnetic material is installed in an electrical and electronic device, such as a digital device, by being arranged, for example, on or in the vicinity of an electrical component serving as a generation source of electromagnetic noise.

In a general electrical and electronic device, measures are taken to prevent ignition caused by heat generated by an electronic component, a conductive wire, or the like at the time of operation. For example, in JP 2010-153462 A and JP 2008-85057 A, there are disclosed an electromagnetic interference suppressing body and an electromagnetic wave absorbing material each having flame retardancy.

The electromagnetic interference suppressing body described in Japanese JP 2010-153462 A includes soft magnetic metal powder formed of a soft magnetic material, a polymer binder, and a flame retardant. JP 2010-153462 A discloses, as Example of the soft magnetic metal powder, an Fe—Si—Al alloy processed into flat-shaped powder is included in an amount of 700 parts by weight at maximum.

In JP 2008-85057 A, there is disclosed a clay-like electromagnetic wave absorbing material on the background that a sheet-shaped electromagnetic wave absorbing material is reduced in flexibility when soft magnetic powder having a flat shape is highly filled therein. The electromagnetic wave absorbing material includes an organic matrix (binder), spherical soft magnetic powder, and a liquid resin.

An electronic device utilizing the GHz band has recently come into widespread use, and the device is liable to be affected by electromagnetic noise in the GHz band. Therefore, the composite magnetic material is required to more satisfactorily suppress high-frequency electromagnetic noise in the GHz band, in addition to having flame retardancy.

However, in the electromagnetic interference suppressing body described in JP 2010-153462 A, an effect of suppressing the high-frequency electromagnetic noise is sometimes reduced in spite of having relatively high magnetic permeability in the GHz band. Such tendency becomes remarkable particularly in the case of high-frequency electromagnetic noise in the band of 3 GHz or more. The composite magnetic material is required to satisfactorily suppress the high-frequency electromagnetic noise in the GHz band, particularly in the band of 3 GHz or more, and have excellent flame retardancy.

A viscous material, such as the electromagnetic wave absorbing material described in JP 2008-85057 A, has a risk of being easily deformed by, for example, relatively small external force or its own weight, and has a difficulty in being restored to its original shape even after the external force is removed.

Therefore, when the electromagnetic wave absorbing material described in JP 2008-85057 A is mounted to a target, it is required to adopt such a mounting method as to enable a preset shape. It is considered that the mounting of the electromagnetic wave absorbing material is difficult (the electromagnetic wave absorbing material has poor mounting properties).

In addition, when the electromagnetic wave absorbing material is deformed by, for example, accidental external force or its own weight after the mounting, and as a result, a portion having a smaller thickness than a design thickness is generated therein, electromagnetic noise leaks out of the portion, and there is a possibility that a desired effect of suppressing electromagnetic noise cannot be obtained.

That is, even when the clay-like electromagnetic wave absorbing material is formed into a sheet shape, it is difficult to form (i.e., process) the absorbing material in a mode in which the shape can be maintained, resulting in poor mounting properties. There is a possibility that the electromagnetic noise cannot be reliably suppressed.

SUMMARY OF THE INVENTION

This invention has been made in view of the above-mentioned circumstances, and an object of this invention is to provide a composite magnetic material which has excellent flame retardancy and excellent mounting properties, and which is capable of satisfactorily and reliably suppressing high-frequency electromagnetic noise in the GHz band. Another object of this invention is to provide an electrical and electronic device including such composite magnetic material and a method of manufacturing such composite magnetic material.

In order to achieve the above-mentioned object, a composite magnetic material according to a first aspect of this invention comprises spherical soft magnetic metal powder incorporated in the composite magnetic material in a dispersed manner;

a flame retardant incorporated in the composite magnetic material in a dispersed manner; and a binder configured to bind the soft magnetic metal powder and the flame retardant, wherein the composite magnetic material is formed and processed into a sheet shape, and wherein the composite magnetic material has a volume occupancy of the soft magnetic metal powder of 45 vol % or more and 68 vol % or less In order to achieve the above-mentioned object, an electrical and electronic device according to a second aspect of this invention comprises the composite magnetic material.

In order to achieve the above-mentioned object, a method of manufacturing a composite magnetic material according to a third aspect of this invention comprises kneading spherical soft magnetic metal powder, a flame retardant, and a binder to produce a kneaded product;

forming the kneaded product into a sheet shape to produce a formed body;

and heating and pressing the formed body to produce a composite magnetic material having a volume occupancy of the soft magnetic metal powder of 45 vol % or more and 68 vol % or less and having been formed and processed into a sheet shape.

BRIEF DESCRIPTION OF THE DRAWINGS

FIG. 1A is a perspective view, and FIG. 1B is a sectional view for illustrating part of FIG. 1A in an enlarged manner.

DESCRIPTION OF THE EMBODIMENTS

Now, with reference to the drawings, at least one embodiment of this invention is described. The same components are denoted by the same reference symbols in all of the drawings.

(Structure of Composite Magnetic Material 100)

Figure 1A:
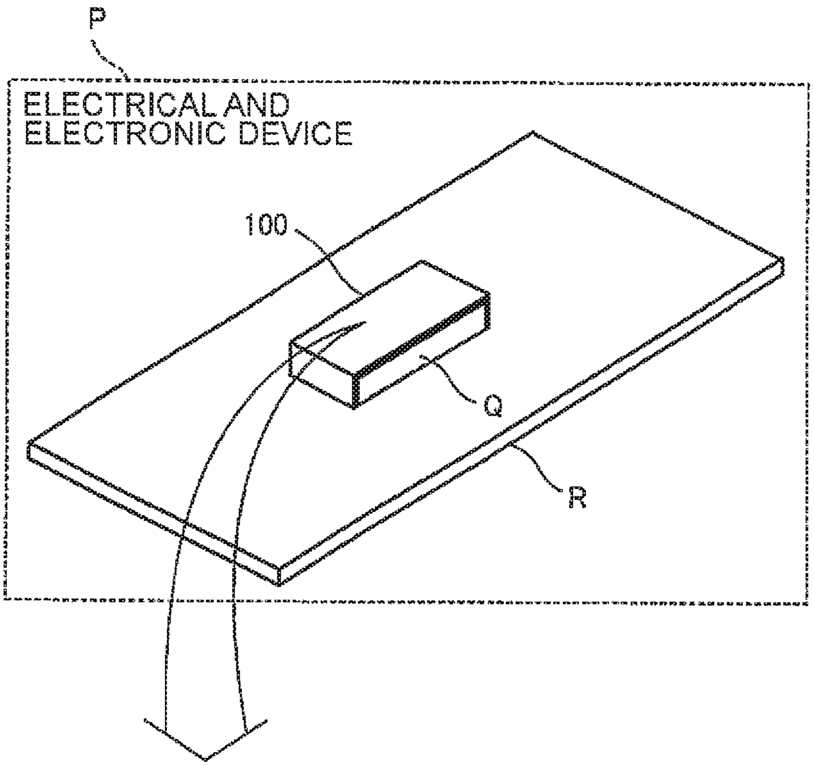
FIG. 1A and FIG. 1B are each a view for illustrating a composite magnetic material according to one embodiment of this invention.

A composite magnetic material 100 according to at least one embodiment of this invention is typically a member which is fixed to an element Q installed in an electrical and electronic device P as illustrated in FIG. 1A serving as a perspective view, and which is configured to suppress electromagnetic noise to be radiated from the element Q. As illustrated in FIG. 1A, the element Q is installed in the electrical and electronic device P, for example, by being arranged on a substrate R. For example, an element other than the element Q, a circuit, and wiring are generally arranged on the substrate R, while these components are not shown in FIG. 1A.

The "electrical and electronic device P" as used herein refers to a device which is electrically operated. The electrical and electronic device P includes home appliances, industrial electrical devices, medical devices, information devices, digital devices, and the like.

The composite magnetic material 100 is formed and processed into a sheet shape.

The "formed and processed" as used herein means that the composite magnetic material 100 is arranged into a preset shape in a mode in which the preset shape can be maintained. The "mode in which the preset shape can be maintained" means, for example, a mode in which the composite magnetic material 100 is not easily deformed by, for example, external force or its own weight, or a mode in which the composite magnetic material 100 can be restored to its original shape even when deformed by, for example, external force or its own weight.

An object to be "formed and processed" includes, for example, an object which is not substantially deformed, and as well, an elastic body which, even when deformed, can be restored to its original shape after force responsible for the deformation is removed. Examples of the object to be "formed and processed" may include a rubber and a resin. Meanwhile, the object to be "formed and processed" excludes a viscous body (e.g., clay or a clay-like object) which is easily plastically deformed by, for example, external force or its own weight.

The thickness of the composite magnetic material 100 may be appropriately set, but is 20 μm (micrometers) or more and 1 mm (millimeter) or less in this embodiment.

While the composite magnetic material 100 is illustrated with a larger thickness in FIG. 1A for easy understanding, a dimensional ratio among the element Q, the substrate R, and the composite magnetic material 100 may be appropriately changed.

In this embodiment, the composite magnetic material 100 has flexibility. Therefore, as illustrated in FIG. 1A, the composite magnetic material 100 can be fixed to the element Q under the state of being curved or bent with, for example, a double-sided tape or an adhesive.

Figure 1B:
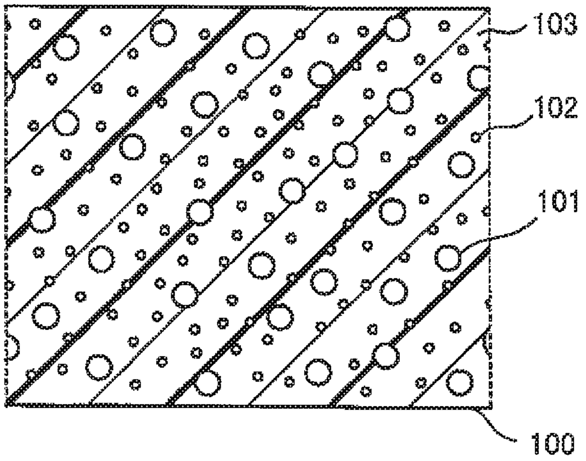

The composite magnetic material 100 according to this embodiment includes, as illustrated in FIG. 1B serving as a partial enlarged sectional view in a plane parallel to a thickness direction thereof, soft magnetic metal powder 101 and a flame retardant 102 which are each incorporated in a dispersed manner, and a binder 103 configured to bind the soft magnetic metal powder 101 and the flame retardant 102.

The soft magnetic metal powder 101 is spherical powder which is incorporated in the composite magnetic material 100 in a dispersed manner.

A material for the soft magnetic metal powder 101 is soft magnetic metal powder suitable for suppression of electromagnetic noise. As the material for the soft magnetic metal powder 101, for example, an Fe—Si—Al alloy, pure iron, an Fe—Si alloy, an Fe—Si—Cr alloy, a Ni—Fe alloy, a Mo—Ni—Fe alloy, and an amorphous alloy may be adopted. Of those, an Fe—Si—Al alloy is particularly preferred.

A surface of the soft magnetic metal powder 101 may be coated with an insulating layer. The insulation layer is, for example, an oxide coating provided by oxidizing the surface of the metal powder, or an organic coating.

The average particle diameter of the soft magnetic metal powder 101 is preferably less than 10 μm, particularly preferably 4 μm or more and 8 μm or less. The "average particle diameter" as used herein refers to a median diameter (D50), and the same applies hereinafter.

In addition, the volume occupancy of the soft magnetic metal powder 101 is 45 vol % or more and 68 vol % or less, preferably 55 vol % or more and 68 vol % or less.

The flame retardant 102 is spherical powder which is incorporated in the composite magnetic material 100 in a dispersed manner and which has an average particle diameter of less than 2 μm.

The flame retardant 102 may have any other appropriate shape than a spherical shape. In addition, when the flame retardant 102 has a spherical shape, the average particle diameter thereof may be 2 μm or more.

A material for the flame retardant 102 may be any material having flame retardancy, but is preferably a nitrogen-based compound having a decomposition temperature of 300 degrees (° C.) or more. The nitrogen-based compound suitable for the material for the flame retardant 102 may be, for example, a tetrazole-based compound, a melamine-based compound, or a mixture thereof. A material particularly preferred for the flame retardant 102 may be, for example, a tetrazole-based compound such as bistetrazole-diammonium ($C_2H_8N_{10}$), or a melamine-based compound such as melamine cyanurate.

The volume occupancy of the flame retardant 102 is 12 vol % or more and 20 vol % or less, preferably 15 vol % or more and 20 vol % or less. The volume occupancy of the flame retardant 102 is not limited thereto, and may be appropriately changed.

The binder 103 is configured to bind the soft magnetic metal powder 101 and the flame retardant 102 as described above in a dispersed state. A material for the binder 103 is desirably a resin which is free of halogen and has high powder filling properties, and may be appropriately selected in consideration of, for example, a cost.

Specific examples of the material for the binder 103 may include an acrylic resin, an acrylic rubber, an ethylene-vinyl acetate copolymer, an ethylene-propylene-diene rubber, an acrylonitrile-butadiene rubber, and a mixture of two or more kinds of the listed materials. Of those, an acrylic rubber, which is free of a cross-linking group, is particularly desired as the material for the binder 103.

The volume occupancy of the binder 103 may be the content of the balance excluding the soft magnetic metal powder 101 and the flame retardant 102. When the composite magnetic material 100 includes any other additive, the volume occupancy of the binder 103 may be the content of the balance excluding the soft magnetic metal powder 101, the flame retardant 102, and the additive.

The configuration of the composite magnetic material 100 according to the at least one embodiment of this invention has been described above. A method of manufacturing a composite magnetic material according to at least one embodiment of this invention is described below.

Figure 2:
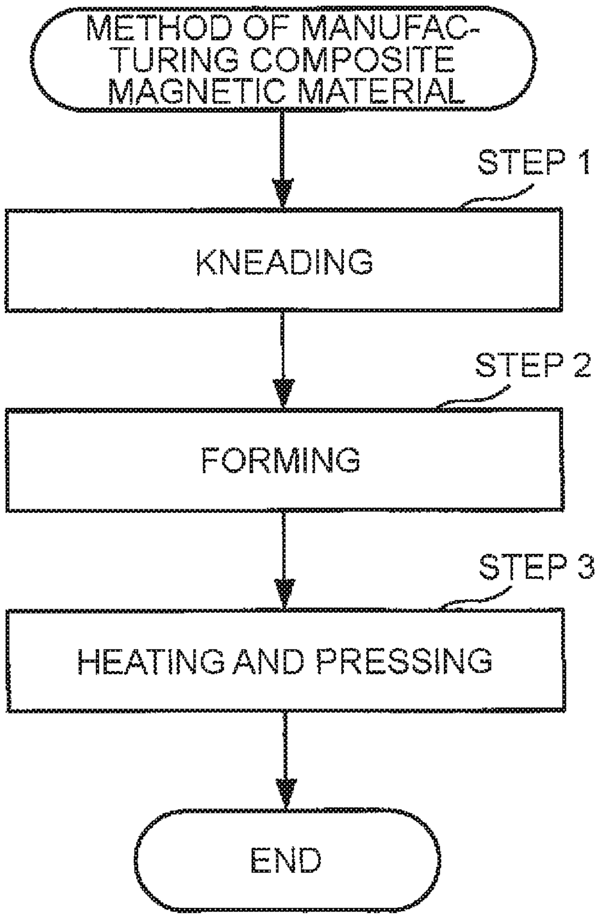
FIG. 2 is a view for illustrating a flow of a method of manufacturing a composite magnetic material according to one embodiment of this invention.

(Method of Manufacturing a Composite Magnetic Material) A method of manufacturing a composite magnetic material according to this embodiment is a method of manufacturing the composite magnetic material 100, and includes steps illustrated in FIG. 2. The method of manufacturing a composite magnetic material is started after the soft magnetic metal powder 101, the flame retardant 102, and the binder 103 are prepared.

As illustrated in FIG. 2, the soft magnetic metal powder 101, the flame retardant 102, and the binder 103 are kneaded at a preset blending ratio with a kneader (Step 1). With this, a kneaded product in which the soft magnetic metal powder 101 and the flame retardant 102 are roughly uniformly dispersed in the binder 103 is produced. When, for example, an additive is incorporated in the composite magnetic material 100 in addition to the soft magnetic metal powder 101 and the flame retardant 102, the additive may be added and kneaded in Step 1.

The kneaded product produced in Step 1 is formed into a sheet shape having a preset thickness (Step 2). With this, a formed body is produced. Specifically, for example, a slurry (application liquid) obtained by dissolving the kneaded product produced in Step 1 in a solvent is applied onto a base material and dried, to thereby be formed into a sheet shape having a preset thickness.

The formed body produced in Step 2 is pressed while heated, for example, with a hot press forming machine (Step 3). With this, the composite magnetic material 100 in which the soft magnetic metal powder 101 and the flame retardant 102 are bound by the binder 103 in a dispersed manner and which is formed and processed into a sheet shape is produced.

In the composite magnetic material 100 produced in Step 3, the volume occupancy of the soft magnetic metal powder 101 is 45 vol % or more and 68 vol % or less, preferably 55 vol % or more and 68 vol % or less. In addition, the volume occupancy of the flame retardant 102 is, for example, 12 vol % or more and 20 vol % or less, preferably 15 vol % or more and 20 vol % or less. The balance excluding the soft magnetic metal powder 101 and the flame retardant 102 is the binder 103. When the additive is incorporated, the balance excluding the soft magnetic metal powder 101, the flame retardant 102, and the additive may be the binder 103.

The heating conditions in Step 3 may be appropriately set, and are set to, for example, 200 degrees (° C.). The pressing conditions may be appropriately set, and are desirably set to, for example, a pressure at which the composite magnetic material 100 can be formed and processed into a sheet shape having a thickness of 20 μm or more and 1 mm or less under the set heating conditions.

Thus, the composite magnetic material 100 can be easily manufactured by the method of manufacturing a composite magnetic material according to this embodiment.

As described above, the composite magnetic material 100 according to the at least one embodiment of this invention has the following actions and effects.

In the composite magnetic material 100 according to this embodiment, the spherical soft magnetic metal powder 101, whose highly filling has hitherto been considered to be difficult, is incorporated at a high volume occupancy of 45 vol % or more and is bound together with the flame retardant 102 by the binder 103.

The soft magnetic metal powder 101 is not flat powder (powder having a flat shape) of the related art but spherical powder (powder having a spherical shape). With this, high-frequency electromagnetic noise in the GHz band including the band of 3 GHz or more can be satisfactorily suppressed. This is presumably because dielectric constant between the respective soft magnetic metal powders 101 is reduced more in the case in which the soft magnetic metal powder 101 is the spherical powder than in the case in which the soft magnetic metal powder 101 is the flat powder. In the case of the spherical powder, magnetization follows an external magnetic field more easily and magnetic permeability is increased more, and as a result, the high-frequency electromagnetic noise in the GHz band including the band of 3 GHz or more hardly permeates the composite magnetic material 100.

In addition, the soft magnetic metal powder 101 is highly filled at a high volume occupancy of 45 vol % or more. Also with this, an effect of suppressing the high-frequency electromagnetic noise in the GHz band including the band of 3 GHz or more can be improved. Herein, a possible reason why the soft magnetic metal powder 101 can be highly filled is that the spherical powder has a smaller specific surface area than the flat powder, and hence the respective soft magnetic metal powders 101 can be covered and sufficiently bound by a smaller amount of the binder 103 than in the case of the flat powder.

As described above, the high-frequency electromagnetic noise in the GHz band including the band of 3 GHz or more can be satisfactorily suppressed.

Besides, the composite magnetic material 100 according to this embodiment includes the flame retardant 102. The composite magnetic material 100 can achieve flame retardancy comparable to or higher than that of the related art even when the volume occupancy of the flame retardant 102 is lower than in the related art. Therefore, the composite magnetic material 100 having practically sufficient and excellent flame retardancy can be provided with a relatively small amount of the flame retardant 102. A possible reason for this is that, when the soft magnetic metal powder 101 is the spherical powder having a smaller specific surface area than the flat powder, the total reaction heat generated by oxidation of the surface of the soft magnetic metal powder 101 is relatively reduced.

As described above, the composite magnetic material 100 having excellent flame retardancy can be provided.

Further, in the composite magnetic material 100 according to this embodiment, the content of the spherical soft magnetic metal powder 101 is 68 vol % or less. With this, while the flame retardant 102 is incorporated to the extent that the excellent flame retardancy is achieved as described above, the soft magnetic metal powder 101 and the flame retardant 102 can be sufficiently bound by the binder 103, and the composite magnetic material 100 can be formed and processed (arranged into a preset shape so as to achieve formability with which the shape after the forming can be maintained). Moreover, the composite magnetic material 100 is formed and processed into a sheet shape.

When formed and processed into a sheet shape, the composite magnetic material 100 according to this invention can be easily fixed to an arrangement position, for example, through attachment with a double-sided tape or adhesion with an adhesive. In addition, the composite magnetic material 100 has a low possibility of being deformed after the fixation, and can reliably suppress electromagnetic noise serving as a suppression target.

As described above, the composite magnetic material 100 has excellent mounting properties, and can reliably suppress the high-frequency electromagnetic noise in the GHz band.

Accordingly, the composite magnetic material 100 has excellent flame retardancy and excellent mounting properties, and can satisfactorily and reliably suppress the high-frequency electromagnetic noise in the GHz band.

Further, in the composite magnetic material 100 according to this embodiment, the soft magnetic metal powder 101 has a spherical shape. With this, the surface of the composite magnetic material 100 can be smoothened. Accordingly, the composite magnetic material 100 having excellent appearance can be provided.

Further, as described in the above-mentioned embodiment, the volume occupancy of the soft magnetic metal powder 101 in the composite magnetic material 100 is preferably 55 vol % or more and 68 vol % or less. The spherical soft magnetic metal powder 101 can be highly filled at a volume occupancy of 55 vol % or more as just described. With this, the composite magnetic material 100 can more satisfactorily suppress the high-frequency electromagnetic noise in the GHz band.

The composite magnetic material 100 according to this embodiment further has flexibility.

In the composite magnetic material according to this invention, the soft magnetic metal powder 101 has a spherical shape as described above, and hence the soft magnetic metal powder 101 and the flame retardant 102 are sufficiently bound by a smaller amount the binder 103 than in the case in which the soft magnetic metal powder 101 has a flat shape. As a result, unlike the case in which the soft magnetic metal powder 101 is the flat powder, even when the soft magnetic metal powder 101 is highly filled, the composite magnetic material 100 which is flexible to the extent that the composite magnetic material 100 can endure bending and which hardly causes delamination can be obtained.

The composite magnetic material 100 has flexibility, and hence can be easily arranged along a curved or bent surface and easily fixed thereto, for example, with a double-sided tape or an adhesive.

Accordingly, limitations in association with the shape of the arrangement position of the composite magnetic material 100 are reduced, and more excellent mounting properties can be imparted.

Further, the flame retardant 102 in the composite magnetic material 100 according to this embodiment is the nitrogen-based compound. The nitrogen-based compound is a substance having excellent flame retardancy. In addition, the nitrogen-based compound is free of halogen and phosphorus, and hence has a low environmental load. Accordingly, while excellent flame retardancy is imparted, a reduction in environmental load can be achieved.

Further, the binder 103 in the composite magnetic material 100 according to this embodiment is the acrylic rubber. The acrylic rubber is excellent in heat resistance and has flexibility. In addition, the acrylic rubber is free of halogen, and hence has a low environmental load. Further, the acrylic rubber is substantially free of silicon (Si), and hence there is little possibility that siloxane, which is a possible cause of a contact failure in an electronic component, is generated.

Accordingly, while excellent heat resistance and excellent mounting properties are imparted, the environmental load can be reduced, and the possibility of generation of the contact failure can be reduced.

Further, the average particle diameter of the soft magnetic metal powder 101 in the composite magnetic material 100 according to this embodiment is less than 10 μm.

When the average particle diameter of the soft magnetic metal powder is set to less than 10 μm, the dielectric constant can be reduced, and the magnetic permeability can be increased. As a result, the high-frequency electromagnetic noise in the GHz band can be more satisfactorily suppressed.

Further, the average particle diameter of the flame retardant 102 in the composite magnetic material 100 according to this embodiment is less than 2 μm.

When the average particle diameter of the flame retardant 102 is reduced, the flame retardant 102 can be uniformly dispersed in the composite magnetic material 100. In addition, the total surface area of the flame retardant 102 per unit volume of the composite magnetic material 100 can be further increased.

Accordingly, more excellent flame retardancy can be imparted.

Further, the thickness of the composite magnetic material 100 according to this embodiment is 20 μm or more and 1 mm or less. When the composite magnetic material 100 is formed and processed into a thin sheet shape, the flexible composite magnetic material 100 can be obtained. Accordingly, limitations in association with the shape of the arrangement position are further reduced, and more excellent mounting properties can be imparted.

The electrical and electronic device P according to this embodiment includes the composite magnetic material 100. As described above, the composite magnetic material 100 has excellent flame retardancy and excellent mounting properties, and can satisfactorily and reliably suppress the high-frequency electromagnetic noise in the GHz band. Accordingly, the electrical and electronic device P which has excellent flame retardancy, which is easily manufactured, and in which radiation of the high-frequency electromagnetic noise in the GHz band is satisfactorily and reliably suppressed can be provided.

In addition, the electrical and electronic device P according to this embodiment has actions and effects in association with the other actions and effects exhibited by the composite magnetic material 100 as described above.

While the composite magnetic material 100 according to the at least one embodiment of this invention has been described above, this invention is not limited thereto and may be appropriately changed.

For example, while an example in which the composite magnetic material 100 is fixed to the element Q has been described in the above-mentioned embodiment, the element Q is an example of a noise generation source which radiates electromagnetic noise serving as a suppression target.

The noise generation source is not limited to the element Q, and may be, for example, an element, a circuit, or wiring arranged on the substrate R, or may be an electrical component, such as a conductive wire. In addition, for example, the composite magnetic material 100 may be not only directly fixed to the noise generation source but also fixed to a peripheral member of the noise generation source. Further, for example, when the noise generation source is a conductive wire, the composite magnetic material 100 may be fixed thereto by being wound around the conductive wire. The composite magnetic material 100 has excellent mounting properties as described above, and hence can be easily arranged and fixed to such position.

Now, composite magnetic materials 100 according to more specific examples (Examples) of the composite magnetic material 100 according to the above-mentioned embodiment are described.

EXAMPLES

Example 1

The contents of the soft magnetic metal powder 101, the flame retardant 102, and the binder 103 constituting the composite magnetic material 100 according to Example 1 are 52 vol %, 15 vol %, and 33 vol %, respectively, in terms of a volume occupancy.

The soft magnetic metal powder 101 according to Example 1 is formed of Si (silicon), Cr (chromium), and Fe (iron), and the contents of Si and Cr are 3.5±0.2 mass % (mass percent) and 4.5±0.2 mass %, respectively, with the balance being Fe.

The soft magnetic metal powder 101 according to Example 1 has an average particle diameter of 6 μm.

The flame retardant 102 according to Example 1 is formed of melamine cyanurate having an average particle diameter of 5 μm or less, a loose bulk specific gravity of from 0.1 g/ml to 0.3 g/ml (gram/milliliter), and a true specific gravity of 1.52 g/ml (grams/milliliter).

The binder 103 according to Example 1 is an acrylic rubber.

The composite magnetic material 100 according to Example 1 is manufactured through Step 1 to Step 3 described in the above-mentioned embodiment after the above-mentioned composition (the soft magnetic metal powder 101, the flame retardant 102, and the binder 103) is prepared.

Specifically, in Step 1 according to Example 1, the prepared composition is kneaded with a kneader so that the soft magnetic metal powder 101 and the flame retardant 102 are roughly uniformly dispersed in the binder 103.

In Step 2 according to Example 1, a kneaded product obtained in Step 1 is dissolved in a solvent to produce a slurry. The slurry is applied onto a resin sheet serving as a base material. The applied slurry is dried, and then the resin sheet is peeled off from the dried slurry. Thus, a formed body in which the kneaded product is formed into a sheet shape is obtained.

In Step 3 according to Example 1, the formed body produced in Step 2 is heated and pressed at a forming temperature of 300 degrees with a hot press forming machine. Thus, the composite magnetic material 100 according to Example 1 which is formed and processed into a sheet shape having a thickness of 0.3 mm is produced.

Example 2

The composite magnetic material 100 according to Example 2 is configured in the same manner as in the case of the composite magnetic material 100 according to Example 1 except for the average particle diameter of the soft magnetic metal powder 101. The soft magnetic metal powder 101 according to Example 2 has an average particle diameter of 10 μm.

In addition, the composite magnetic material 100 according to Example 2 is produced by the same method as in the case of the composite magnetic material 100 according to Example 1 except that the soft magnetic metal powder 101 to be prepared has an average particle diameter of 10 μm.

Comparison of Noise Suppression Performance Between Composite Magnetic Materials 100 According to Examples 1 and 2

Figure 3A:
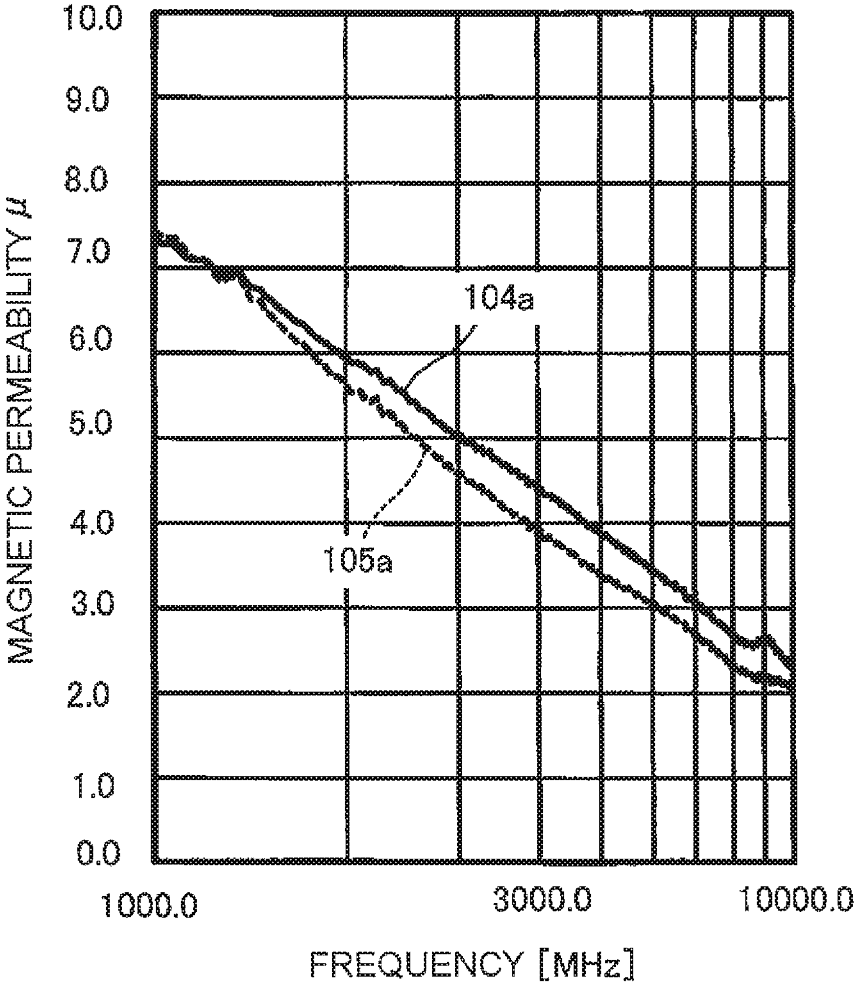
FIG. 3A is a graph showing frequency characteristics of magnetic permeability μ with regard to composite magnetic materials according to Examples 1 and 2.
Figure 3B:
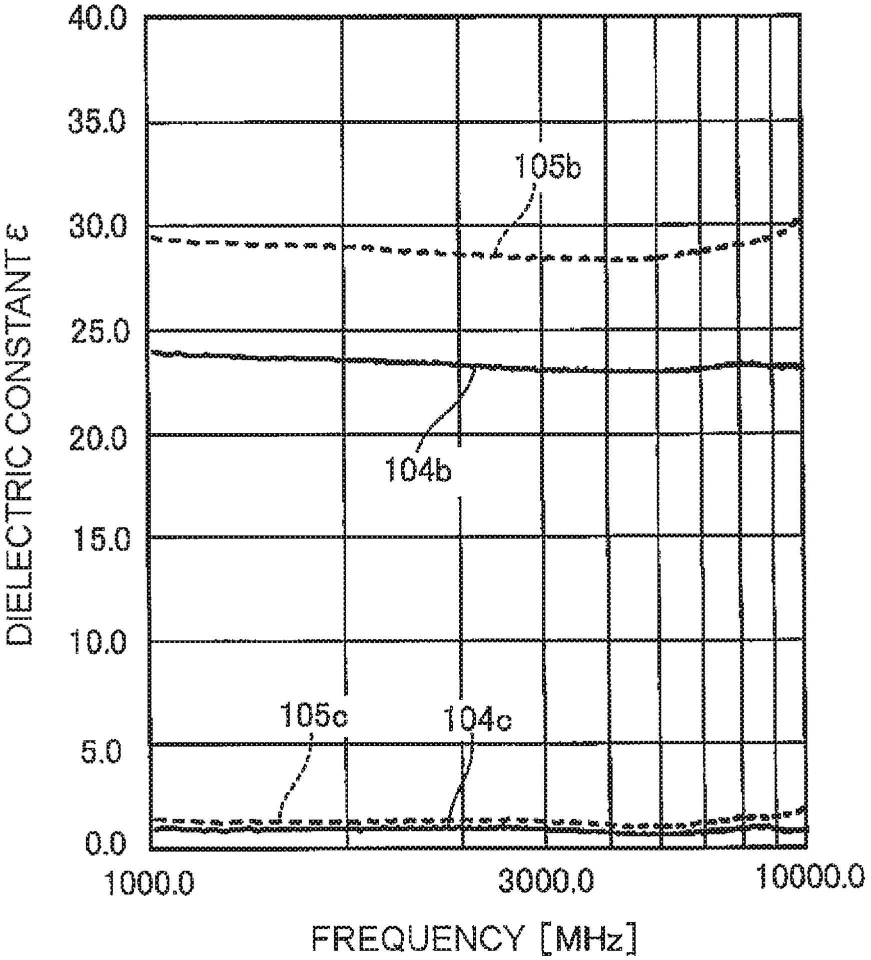
FIG. 3B is a graph showing frequency characteristics of dielectric constant ε with regard to the composite magnetic materials according to Examples 1 and 2.
Figure 3C:
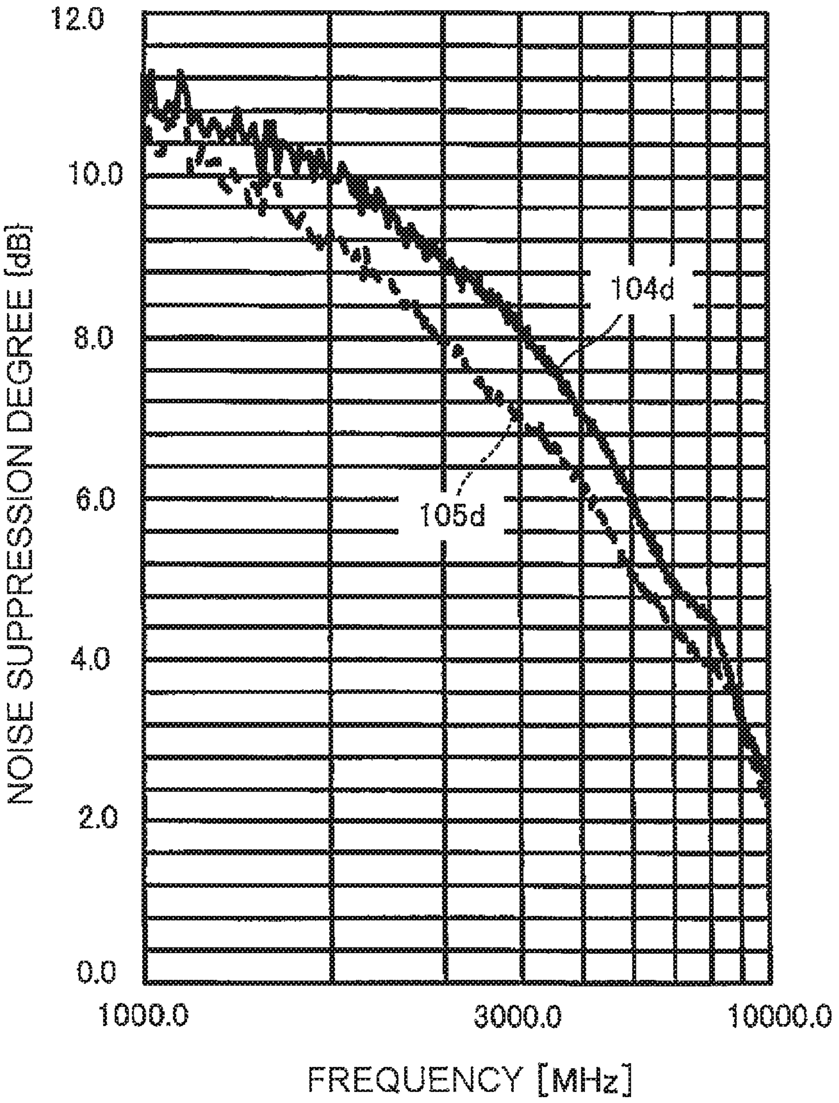
FIG. 3C is a graph showing frequency characteristics of a noise suppression degree with regard to the composite magnetic materials according to Examples 1 and 2.

FIG. 3A, FIG. 3B, and FIG. 3C are graphs showing the experimental results of frequency characteristics for the composite magnetic materials 100 according to Examples 1 and 2. FIG. 3A, FIG. 3B, and FIG. 3C show frequency characteristics of magnetic permeability p, frequency characteristics of dielectric constant ε, and frequency characteristics of a noise suppression degree, respectively, with regard to the composite magnetic materials 100 according to Examples 1 and 2.

In each of FIG. 3A, FIG. 3B, and FIG. 3C, the frequency (unit: [MHz] (megahertz)) is represented on the abscissa.

In FIG. 3A, the magnetic permeability p is represented on the ordinate. Herein, the "magnetic permeability p" refers to a value determined by the following equation (1) when a real part and an imaginary part of the magnetic permeability are defined as μ' and μ", respectively. In the equation (1), the "A" represents a power.

μ=(μ'^2+μ"^2)^(½)    Equation (1)

In FIG. 3A, the frequency characteristics of the magnetic permeability p of the composite magnetic material 100 according to Example 1 are represented by the solid line 104*a*, and the frequency characteristics of the magnetic permeability p of the composite magnetic material 100 according to Example 2 are represented by the dotted line 105*a*.

In FIG. 3B, a real part ε' and an imaginary part ε' of the dielectric constant ε are represented on the ordinate.

In FIG. 3B, the characteristics of the real part ε' of the dielectric constant ε of the composite magnetic material 100 according to Example 1 are represented by the solid line 104*b*, and the characteristics of the imaginary part ε" thereof are represented by the solid line 104*c*. In addition, in FIG. 3B, the characteristics of the real part ε' of the dielectric constant of the composite magnetic material 100 according to Example 2 are represented by the dotted line 105*b*, and the characteristics of the imaginary part ε' thereof are represented by the dotted line 105*c*.

In FIG. 3C, the noise suppression degree is represented on the ordinate in terms of [dB] (decibel) as a unit. Herein, the "noise suppression degree" refers to a value representing the degree of suppression of high-frequency electromagnetic noise radiated from a noise source when the composite magnetic material 100 is arranged.

In FIG. 3C, the frequency characteristics of the noise suppression degree of the composite magnetic material 100 according to Example 1 are represented by the solid line 104*d*, and the frequency characteristics of the noise suppression degree of the composite magnetic material 100 according to Example 2 are represented by the dotted line 105*d*.

In general, from the viewpoint of noise suppression performance, higher magnetic permeability μ is desired. In addition, lower dielectric constant ε is desired because it is considered that, when the dielectric constant ε is lower, magnetization follows an external magnetic field more easily and the magnetic permeability p is increased more.

With reference to FIG. 3A, the magnetic permeability μ of the composite magnetic material 100 according to Example 1 and the magnetic permeability μ of the composite magnetic material 100 according to Example 2 are at the same level in the GHz band of roughly less than 1.5 GHz. However, the magnetic permeability μ of the composite magnetic material 100 according to Example 1 is higher than that of the composite magnetic material 100 according to Example 2 in the high-frequency band of roughly more than 1.5 GHz.

In addition, with reference to FIG. 3B, the ε' and ε" of the dielectric constant of the composite magnetic material 100 according to Example 1 are lower than those of the composite magnetic material 100 according to Example 2 in the whole GHz band.

Therefore, from the viewpoint of the noise suppression performance, the composite magnetic material 100 according to Example 1 is superior to the composite magnetic material 100 according to Example 2 in each of the magnetic permeability p and the dielectric constant ε' and ε".

Moreover, with reference to FIG. 3C, the noise suppression degree of the composite magnetic material 100 according to Example 1 is higher than that of the composite magnetic material 100 according to Example 2 in the whole GHz band. That is, also with reference to the noise suppression degree, as presumed from the frequency characteristics of the magnetic permeability μ and the dielectric constant ε' and ε", the composite magnetic material 100 according to Example 1 is superior to the composite magnetic material 100 according to Example 2.

From the results of the comparison of the noise suppression performance between the composite magnetic materials 100 according to Examples 1 and 2 as described above, it is found that, when the soft magnetic metal powder 101 has an average particle diameter in the vicinity of 6 μm, excellent noise suppression performance can be obtained.

Accordingly, the average particle diameter of the soft magnetic metal powder 101 in the composite magnetic material 100 is particularly preferably 4 μm or more and 8 μm or less. With this, the dielectric constant can be further reduced, and the magnetic permeability can be further increased. As a result, the high-frequency electromagnetic noise in the GHz band can be more satisfactorily suppressed.

Examples 3 to 9

The contents of the binder 103 and the flame retardant 102 in each of the composite magnetic materials 100 according to Examples 3 to 9 are 33 vol % and 10 vol %, respectively, in terms of a volume occupancy as shown in Table 1, with the balance (57 vol %) being the soft magnetic metal powder 101.

The details of the soft magnetic metal powder 101, the flame retardant 102, and the binder 103 according to Examples 3 to 9 are the same as those of Example 1.

The composite magnetic materials 100 according to Examples 3 to 9 are each produced through the same Step 1 to Step 3 as in the case of the composite magnetic material 100 according to Example 1. However, the thicknesses of the finally manufactured composite magnetic materials 100 according to Examples 3 to 9 having been formed and processed into a sheet shape are 0.02 mm, 0.07 mm, 0.1 mm, 0.2 mm, 0.3 mm, 0.5 mm, and 1.0 mm, respectively, as shown in Table 1.

TABLE 1

| | Example 3 | Example 4 | Example 5 | Example 6 | Example 7 | Example 8 | Example 9 |
|---|---|---|---|---|---|---|---|
| Soft magnetic metal powder | | | | 57 vol % | | | |
| Flame retardant | | | | 10 vol % | | | |
| Binder | | | | 33 vol % | | | |
| Thickness | 0.02 mm | 0.07 mm | 0.10 mm | 0.20 mm | 0.30 mm | 0.50 mm | 1.0 mm |

Examples 10 to 16

The composite magnetic materials 100 according to Examples 10 to 16 are the same as the composite magnetic materials 100 according to Examples 3 to 9, respectively, except that the volume occupancy of the flame retardant 102 in each of the composite magnetic materials 100 according to Examples 10 to 16 is 15%.

That is, the contents of the binder 103 and the flame retardant 102 in each of the composite magnetic materials 100 according to Examples 10 to 16 are 33 vol % and 15 vol %, respectively, in terms of a volume occupancy as shown in Table 2, with the balance (52 vol %) being the soft magnetic metal powder 101. In addition, the details of the soft magnetic metal powder 101, the flame retardant 102, and the binder 103 according to Examples 10 to 16 are the same as those of

Example 1

The composite magnetic materials 100 according to Examples 10 to 16 are each produced through the same Step 1 to Step 3 as in the case of the composite magnetic material 100 according to Example 1. However, the thicknesses of the finally manufactured composite magnetic materials 100 according to Examples 10 to 16 having been formed and processed into a sheet shape are 0.02 mm, 0.07 mm, 0.1 mm, 0.2 mm, 0.3 mm, 0.5 mm, and 1.0 mm, respectively, as shown in Table 2.

TABLE 2

| | Example 10 | Example 11 | Example 12 | Example 13 | Example 14 | Example 15 | Example 16 |
|---|---|---|---|---|---|---|---|
| Soft magnetic metal powder | | | | 52 vol % | | | |
| Flame retardant | | | | 15 vol % | | | |
| Binder | | | | 33 vol % | | | |
| Thickness | 0.02 mm | 0.07 mm | 0.10 mm | 0.20 mm | 0.30 mm | 0.50 mm | 1.0 mm |

Examples 17 to 23

The composite magnetic materials 100 according to Examples 17 to 23 are the same as the composite magnetic materials 100 according to Examples 3 to 9, respectively, except that the volume occupancy of the flame retardant 102 in each of the composite magnetic materials 100 according to Examples 17 to 23 is 20%.

That is, the contents of the binder 103 and the flame retardant 102 in each of the composite magnetic materials 100 according to Examples 17 to 23 are 33 vol % and 20 vol %, respectively, in terms of a volume occupancy as shown in Table 3, with the balance (47 vol %) being the soft magnetic metal powder 101. In addition, the details of the soft magnetic metal powder 101, the flame retardant 102, and the binder 103 according to Examples 17 to 23 are the same as those of Example 1.

The composite magnetic materials 100 according to Examples 17 to 23 are each produced through the same Step 1 to Step 3 as in the case of the composite magnetic material 100 according to Example 1. However, the thicknesses of the finally manufactured composite magnetic materials 100 according to Examples 17 to 23 having been formed and processed into a sheet shape are 0.02 mm, 0.07 mm, 0.1 mm, 0.2 mm, 0.3 mm, 0.5 mm, and 1.0 mm, respectively, as shown in Table 3.

TABLE 3

| | Example 17 | Example 18 | Example 19 | Example 20 | Example 21 | Example 22 | Example 23 |
|---|---|---|---|---|---|---|---|
| Soft magnetic metal powder | | | | 47 vol % | | | |
| Flame retardant | | | | 20 vol % | | | |
| Binder | | | | 33 vol % | | | |
| Thickness | 0.02 mm | 0.07 mm | 0.10 mm | 0.20 mm | 0.30 mm | 0.50 mm | 1.0 mm |

Examples 24 to 30

The contents of the binder 103 and the flame retardant 102 in each of the composite magnetic materials 100 according to Examples 24 to 30 are 30 vol % and 15 vol %, respectively, in terms of a volume occupancy as shown in Table 4, with the balance (55 vol %) being the soft magnetic metal powder 101.

The details of the soft magnetic metal powder 101, the flame retardant 102, and the binder 103 according to Examples 24 to 30 are the same as those of Example 1.

The composite magnetic materials 100 according to Examples 24 to 30 are each produced through the same Step 1 to Step 3 as in the case of the composite magnetic material 100 according to Example 1. However, the thicknesses of the finally manufactured composite magnetic materials 100 according to Examples 24 to 30 having been formed and processed into a sheet shape are 0.02 mm, 0.07 mm, 0.1 mm, 0.2 mm, 0.3 mm, 0.5 mm, and 1.0 mm, respectively, as shown in Table 4.

TABLE 4

| | Example 24 | Example 25 | Example 26 | Example 27 | Example 28 | Example 29 | Example 30 |
|---|---|---|---|---|---|---|---|
| Soft magnetic metal powder | | | | 55 vol % | | | |
| Flame retardant | | | | 15 vol % | | | |
| Binder | | | | 30 vol % | | | |
| Thickness | 0.02 mm | 0.07 mm | 0.10 mm | 0.20 mm | 0.30 mm | 0.50 mm | 1.0 mm |

Examples 31 to 37

The contents of the binder 103 and the flame retardant 102 in each of the composite magnetic materials 100 according to Examples 31 to 37 are 25 vol % and 20 vol %, respectively, in terms of a volume occupancy as shown in Table 5, with the balance (55 vol %) being the soft magnetic metal powder 101.

The details of the soft magnetic metal powder 101, the flame retardant 102, and the binder 103 according to Examples 31 to 37 are the same as those of Example 1.

The composite magnetic materials 100 according to Examples 31 to 37 are each produced through the same Step 1 to Step 3 as in the case of the composite magnetic material 100 according to Example 1. However, the thicknesses of the finally manufactured composite magnetic materials 100 according to Examples 31 to 37 having been formed and processed into a sheet shape are 0.02 mm, 0.07 mm, 0.1 mm, 0.2 mm, 0.3 mm, 0.5 mm, and 1.0 mm, respectively, as shown in Table 5.

TABLE 5

| | Example 31 | Example 32 | Example 33 | Example 34 | Example 35 | Example 36 | Example 37 |
|---|---|---|---|---|---|---|---|
| Soft magnetic metal powder | | | | 55 vol % | | | |
| Flame retardant | | | | 20 vol % | | | |
| Binder | | | | 25 vol % | | | |
| Thickness | 0.02 mm | 0.07 mm | 0.10 mm | 0.20 mm | 0.30 mm | 0.50 mm | 1.0 mm |

Examples 38 to 44

The contents of the binder 103 and the flame retardant 102 in each of the composite magnetic materials 100 according to Examples 38 to 44 are 17 vol % and 15 vol %, respectively, in terms of a volume occupancy as shown in Table 6, with the balance (68 vol %) being the soft magnetic metal powder 101.

The details of the soft magnetic metal powder 101, the flame retardant 102, and the binder 103 according to Examples 38 to 44 are the same as those of Example 1.

The composite magnetic materials 100 according to Examples 38 to 44 are each produced through the same Step 1 to Step 3 as in the case of the composite magnetic material 100 according to Example 1. However, the thicknesses of the finally manufactured composite magnetic materials 100 according to Examples 38 to 44 having been formed and processed into a sheet shape are 0.02 mm, 0.07 mm, 0.1 mm, 0.2 mm, 0.3 mm, 0.5 mm, and 1.0 mm, respectively, as shown in Table 6.

TABLE 6

| | Example 38 | Example 39 | Example 40 | Example 41 | Example 42 | Example 43 | Example 44 |
|---|---|---|---|---|---|---|---|
| Soft magnetic metal powder | | | | 68 vol % | | | |
| Flame retardant | | | | 15 vol % | | | |
| Binder | | | | 17 vol % | | | |
| Thickness | 0.02 mm | 0.07 mm | 0.10 mm | 0.20 mm | 0.30 mm | 0.50 mm | 1.0 mm |

Examples 45 to 51

The contents of the binder 103 and the flame retardant 102 in each of the composite magnetic materials 100 according to Examples 45 to 51 are 12 vol % and 20 vol %, respectively, in terms of a volume occupancy as shown in Table 7, with the balance (68 vol %) being the soft magnetic metal powder 101.

The details of the soft magnetic metal powder 101, the flame retardant 102, and the binder 103 according to Examples 45 to 51 are the same as those of Example 1.

The composite magnetic materials 100 according to Examples 45 to 51 are each produced through the same Step 1 to Step 3 as in the case of the composite magnetic material 100 according to Example 1. However, the thicknesses of the finally manufactured composite magnetic materials 100 according to Examples 45 to 51 having been formed and processed into a sheet shape are 0.02 mm, 0.07 mm, 0.1 mm, 0.2 mm, 0.3 mm, 0.5 mm, and 1.0 mm, respectively, as shown in Table 7.

TABLE 7

| | Example 45 | Example 46 | Example 47 | Example 48 | Example 49 | Example 50 | Example 51 |
|---|---|---|---|---|---|---|---|
| Soft magnetic metal powder | | | | 68 vol % | | | |
| Flame retardant | | | | 20 vol % | | | |
| Binder | | | | 12 vol % | | | |
| Thickness | 0.02 mm | 0.07 mm | 0.10 mm | 0.20 mm | 0.30 mm | 0.50 mm | 1.0 mm |

Evaluation of Flame Retardancy of Composite Magnetic Materials 100 According to Examples 3 to 51

In accordance with the flammability specification UL 94 (Tests for Flammability of Plastic Materials for Parts in Devices and Appliances), the composite magnetic materials 100 according to Examples 3 to 51 were each tested as to whether or not the composite magnetic material had flame retardancy corresponding to the V-0 rating.

In the specification UL 94, the flame retardancy is tested by bringing flame of a gas burner into contact with a lower end of a vertically held test specimen for 10 seconds, and when the flame is extinguished within 30 seconds, bringing flame into contact therewith for an additional 10 seconds.

Moreover, when any one of the following items (i) to (v) is satisfied, it is evaluated that the test specimen has flame retardancy corresponding to the V-0 rating.

(i) A case in which no specimen continues to burn for 10 seconds or more after first and second flame application (ii) A case in which the total afterflame time for 5 specimens after 10 times of flame application does not exceed 50 seconds (iii) A case in which no specimen burns up to a holding clamp (iv) A case in which no specimen drips flaming particles which ignite a cotton indicator placed below the specimen (v) A case in which no specimen continues to glow for 30 seconds or more after second flame application As a result of the above-mentioned test, the composite magnetic materials 100 according to Examples 3 to 51 each exhibited excellent flame retardancy. In particular, the composite magnetic materials 100 according to all Examples except for Examples 7 to 9 (i.e., Examples 3 to 6 and 10 to 51) each met the above-mentioned criterion of the V-0 rating for the flame retardancy.

That is, in the case where the thickness of the composite magnetic material 100 was from about 0.02 mm to about 0.2 mm, excellent flame retardancy corresponding to the V-0 rating was able to be achieved even when the content of the flame retardant 102 was about 10%. In addition, in the case where the content of the flame retardant 102 was 15% or 20%, excellent flame retardancy corresponding to the V-0 rating was able to be achieved at any thickness of the composite magnetic material 100 in the range of from 0.02 mm to 1.0 mm.

Accordingly, the volume occupancy of the flame retardant 102 in the composite magnetic material 100 is preferably 12 vol % or more and 20 vol % or less. With this, in the composite magnetic material 100 having been formed and processed into a sheet shape having a thickness of from 0.02 mm to 1.0 mm, flame retardancy corresponding to the V-0 rating or close thereto can be achieved. Accordingly, extremely excellent flame retardancy can be imparted.

Comparative Example 1

As Comparative Example 1, an attempt was made to produce a composite magnetic material 100 having a content of the soft magnetic metal powder 101 of 68 vol %, a content of the flame retardant 102 of 22 vol %, and a content of the binder 103 of 10 vol %, and having been formed and processed into a sheet shape. However, the composite magnetic material 100 became such a brittle product that the soft magnetic metal powder 101 and the flame retardant 102 were not sufficiently bound, and the soft magnetic metal powder 101 and the flame retardant 102 were easily peeled off from a surface, and its forming and processing into a sheet shape was difficult.

Accordingly, in the composite magnetic material 100, it is particularly desired that the volume occupancy of the soft magnetic metal powder 101 be 55 vol % or more and 68 vol % or less, and the volume occupancy of the flame retardant 102 be 15 vol % or more and 20 vol % or less, with the balance being the binder 103.

Such composite magnetic material 100 can significantly satisfactorily and reliably suppress the high-frequency electromagnetic noise in the GHz band by highly filling the soft magnetic metal powder 101 as described above. Besides, the composite magnetic material 100 can achieve both extremely excellent flame retardancy corresponding to the V-0 rating and such formability as to be formed and processed into a sheet shape at any thickness of from about 0.02 mm to about 1.0 mm.

Accordingly, the composite magnetic material 100 can achieve extremely excellent flame retardancy corresponding to the V-0 rating and excellent mounting properties, and can significantly satisfactorily and reliably suppress the high-frequency electromagnetic noise in the GHz band.

While the embodiments, Examples, modified examples, and the like of this invention have been described above, this invention is not limited thereto. This invention includes, for example, an aspect in which each of the embodiments is changed, an aspect in which each of the embodiments and each of the modified examples are appropriately combined with each other, and an aspect in which each of these aspects is appropriately changed.

This invention is useful, for example, for a composite magnetic material for suppressing electromagnetic noise in the GHz band, particularly in the band of more than 3 GHz, or for manufacturing thereof. In addition, this invention is useful, for example, for an electrical and electronic device in which radiation of electromagnetic noise in the GHz band, particularly in the band of more than 3 GHz, is required to be suppressed.

According to this invention, the composite magnetic material which has excellent flame retardancy and excellent mounting properties, and which is capable of satisfactorily and reliably suppressing high-frequency electromagnetic noise in the GHz band can be provided.

What is claimed is:

1. A composite magnetic material, comprising:

spherical soft magnetic metal powder incorporated in the composite magnetic material in a dispersed manner;

a flame retardant powder incorporated in the composite magnetic material in a dispersed manner; and a binder configured to bind the soft magnetic metal powder and the flame retardant, wherein the composite magnetic material has a sheet shape, wherein the composite magnetic material has a volume occupancy of the soft magnetic metal powder of 45 vol % or more and 68 vol % or less, and a volume occupancy of the flame retardant of 12 vol % or more and 20 vol % or less, wherein the composite magnetic material has a thickness of at least 0.38 mm and not more than 1 mm, wherein the flame retardant powder has a spherical shape with an average particle diameter of 2 μm or more, and wherein the flame retardant is a nitrogen-based compound.

2. The composite magnetic material according to claim 1, wherein the volume occupancy of the soft magnetic metal powder is 55 vol % or more and 68 vol % or less.

3. The composite magnetic material according to claim 1, wherein the composite magnetic material is bendable.

4. The composite magnetic material according to claim 1, wherein the volume occupancy of the flame retardant is 15 vol % or more and 20 vol % or less.

5. The composite magnetic material according to claim 1, wherein the binder is an acrylic rubber.

6. The composite magnetic material according to claim 1, wherein the soft magnetic metal powder has an average particle diameter of less than 10 um.

7. The composite magnetic material according to claim 6, wherein the soft magnetic metal powder has an average particle diameter of 4 μm or more and 8 μm or less.

8. An electrical and electronic device, comprising the composite magnetic material of claim 1.

9. The composite magnetic material according to claim 1, wherein the composite magnetic material consists essentially of the spherical soft magnetic metal powder, the flame retardant, and the binder.

10. The composite magnetic material according to claim 1, wherein the composite magnetic material consists of the spherical soft magnetic metal powder, the flame retardant, and the binder.

11. The composite magnetic material according to claim 1, wherein the composite magnetic material has the volume occupancy of the soft magnetic metal powder of 45 vol % or more and 68 vol % or less, and the volume occupancy of the flame retardant of 12 vol % or more and 20 vol % or less, and wherein the balance of the composite magnetic material is the binder.

12. The composite magnetic material according to claim 1, wherein the composite magnetic material has the volume occupancy of the soft magnetic metal powder of 45 vol % or more and 68 vol % or less, and the volume occupancy of the flame retardant of 12 vol % or more and 20 vol % or less, and wherein the balance of the composite magnetic material is the binder and an additive.

13. A composite magnetic material, comprising:

spherical soft magnetic metal powder incorporated in the composite magnetic material in a dispersed manner;

a flame retardant powder incorporated in the composite magnetic material in a dispersed manner; and a binder configured to bind the soft magnetic metal powder and the flame retardant, wherein the composite magnetic material has a sheet shape, wherein the composite magnetic material has a volume occupancy of the soft magnetic metal powder of 45 vol % or more and 68 vol % or less, and a volume occupancy of the flame retardant of 12 vol % or more and 20 vol % or less, and wherein the balance of the composite magnetic material is the binder, wherein the composite magnetic material has a thickness of at least 0.38 mm and not more than 1 mm, wherein the flame retardant powder has a spherical shape with an average particle diameter of 2 μm or more, and wherein the flame retardant is a nitrogen-based compound.

14. A composite magnetic material, consisting of:

spherical soft magnetic metal powder incorporated in the composite magnetic material in a dispersed manner;

a flame retardant powder incorporated in the composite magnetic material in a dispersed manner; and a binder configured to bind the soft magnetic metal powder and the flame retardant, wherein the composite magnetic material has a sheet shape, wherein the composite magnetic material has a volume occupancy of the soft magnetic metal powder of 45 vol % or more and 68 vol % or less, and a volume occupancy of the flame retardant of 12 vol % or more and 20 vol % or less, wherein the composite magnetic material has a thickness of at least 0.38 mm and not more than 1 mm, wherein the flame retardant powder has a spherical shape with an average particle diameter of 2 μm or more, and wherein the flame retardant is a nitrogen-based compound.

15. A method of manufacturing the composite magnetic material according to claim 1, the method comprising:

kneading the spherical soft magnetic metal powder, the flame retardant, and the binder to produce a kneaded product;

forming the kneaded product into the sheet shape to produce a formed body; and heating and pressing the formed body to produce the composite magnetic material having the volume occupancy of the soft magnetic metal powder of 45 vol % or more and 68 vol % or less, and the volume occupancy of the flame retardant of 12 vol % or more and 20 vol % or less, and having been formed and processed into the sheet shape.

* * * * *